US008212147B2

(12) United States Patent
Rhea et al.

(10) Patent No.: US 8,212,147 B2
(45) Date of Patent: Jul. 3, 2012

(54) FINGER FRIENDLY TWIST-ON WIRE CONNECTOR

(75) Inventors: Steven Rhea, St. Peters, MO (US); L. Herbert King, Jr., Jupiter, FL (US); James Keeven, O'Fallon, MO (US)

(73) Assignee: The Patent Store LLC, O'Fallon, MO (US)

( * ) Notice: Subject to any disclaimer, the term of this patent is extended or adjusted under 35 U.S.C. 154(b) by 297 days.

(21) Appl. No.: 12/586,947

(22) Filed: Sep. 30, 2009

(65) Prior Publication Data

US 2010/0018741 A1 Jan. 28, 2010

Related U.S. Application Data

(60) Continuation-in-part of application No. 12/455,865, filed on Jun. 8, 2009, now Pat. No. 8,067,692, which is a division of application No. 11/515,465, filed on Sep. 1, 2006, now Pat. No. 7,560,645, which is a continuation-in-part of application No. 11/249,868, filed on Oct. 13, 2005, now abandoned.

(51) Int. Cl.
*H02G 15/08* (2006.01)

(52) U.S. Cl. .......................................................... 174/87

(58) Field of Classification Search ..................... 174/87
See application file for complete search history.

(56) References Cited

U.S. PATENT DOCUMENTS

| | | | | |
|---|---|---|---|---|
| 2,890,266 | A | 6/1959 | Bollmeier | 174/87 |
| D186,596 | S | 11/1959 | Schinske | D26/10 |
| D186,597 | S | 11/1959 | Schinske | D26/10 |
| D186,600 | S | 11/1959 | Schinske | D26/10 |
| 3,001,002 | A | 9/1961 | Schinske | 174/87 |
| 3,056,851 | A | 10/1962 | Scott | 174/87 |
| 3,075,038 | A | 1/1963 | Schinske | 174/87 |
| 3,097,257 | A | 7/1963 | Cheney | 174/87 |
| D196,112 | S | 8/1963 | Esser | D26/1 |
| 3,156,761 | A | 11/1964 | Schinske | 174/87 |
| D200,538 | S | 3/1965 | Esser | D26/1 |
| 3,297,816 | A | 1/1967 | Waddington | 174/87 |
| 3,448,223 | A | 6/1969 | Thorsman | 174/87 |
| 3,519,707 | A | 7/1970 | Krup | 264/249 |
| D223,611 | S | 5/1972 | Anderson | D26/1 |
| 3,676,574 | A | 7/1972 | Johansson et al. | 174/87 |
| D233,891 | S | 12/1974 | Aldighieri | D26/1 C |
| 3,875,324 | A | 4/1975 | Waddington et al. | 174/87 |

(Continued)

OTHER PUBLICATIONS

Ideal Industries, Inc. Twister PRO Wire Connector literature, www.idealindustries.com, ©2009.

*Primary Examiner* — Chau Nguyen
(74) *Attorney, Agent, or Firm* — Jacobson & Johnson LLC

(57) ABSTRACT

A finger friendly twist-on wire connector having a spiral coil and an open end rigid shell secured to the spiral coil with the rigid shell having an outer surface with a circumferential band and a closed end supporting a finger cushion material integral to at least a portion of the outer surface of the rigid shell with the finger cushion material including a plurality of circumferentially spaced elongated ribs resiliently deformable in response to radially and tangential finger forces thereon as rotational finger forces are transmitted to the rigid shell through the finger cushion material to thereby inhibit finger fatigue and finger injury while allowing the user to maintain a feel of the wire engagement within the wire connector.

12 Claims, 4 Drawing Sheets

U.S. PATENT DOCUMENTS

| | | | | |
|---|---|---|---|---|
| 3,902,005 | A | 8/1975 | Norden | 174/87 |
| 4,220,811 | A | 9/1980 | Scott | 174/87 |
| 4,227,040 | A | 10/1980 | Scott | 174/87 |
| 4,288,657 | A | 9/1981 | Swanson | 174/87 |
| 4,691,079 | A | 9/1987 | Blaha | 174/87 |
| D315,139 | S | 3/1991 | Blaha | D13/150 |
| D315,143 | S | 3/1991 | Blaha | |
| 5,001,301 | A | 3/1991 | Marr et al. | 174/87 |
| 5,023,401 | A | 6/1991 | Clifton | 174/87 |
| 5,113,037 | A | 5/1992 | King, Jr. et al. | 174/87 |
| 5,132,494 | A | 7/1992 | Burton et al. | 174/87 |
| 5,151,239 | A | 9/1992 | King, Jr. | 264/272.11 |
| D339,106 | S | 9/1993 | McLaughlin et al. | D13/150 |
| 5,260,515 | A | 11/1993 | Braun, Jr. | 174/87 |
| D345,962 | S | 4/1994 | Clifton et al. | D13/150 |
| 5,531,618 | A | 7/1996 | Market | 439/840 |
| 5,557,069 | A | 9/1996 | Whitehead et al. | 174/87 |
| 5,557,070 | A | 9/1996 | Tamm | 174/87 |
| 5,559,307 | A | 9/1996 | Whitehead et al. | 174/87 |
| D379,348 | S | 5/1997 | Korinek | D13/150 |
| 5,894,110 | A | 4/1999 | Simmons et al. | 174/87 |
| 6,025,559 | A | 2/2000 | Simmons | 174/87 |
| 6,198,049 | B1 | 3/2001 | Korinek | 174/87 |
| 6,478,606 | B1 * | 11/2002 | McNerney et al. | 439/415 |
| 6,677,530 | B2 | 1/2004 | Blaha et al. | 174/87 |

* cited by examiner

FINGER FRIENDLY TWIST-ON WIRE CONNECTOR

CROSS REFERENCE TO RELATED APPLICATIONS

This application is a continuation in part of U.S. patent application Ser. No. 12/455,865 titled Cushion Grip Twist-on Wire Connector Filed Jun. 8, 2009, now U.S. Pat. No. 8,067,692 which is a divisional of U.S. application Ser. No. 11/515,465 titled Twist-on Wire Connector Filed Sept. 1, 2006 (now U.S. Pat. No. 7,560,645) which is a continuation in part of U.S. patent application Ser. No. 11/249,868 filed Oct. 13, 2005 titled Cushioned Wire Connector (now Abandoned).

FIELD OF THE INVENTION

This invention relates generally to twist-on wire connectors and, more specifically, to a finger friendly twist-on wire connector formed from both rigid material and finger cushion material to provide enhanced finger gripping that provides a balanced grasp and feel regardless of the users finger position.

STATEMENT REGARDING FEDERALLY SPONSORED RESEARCH OR DEVELOPMENT

None

REFERENCE TO A MICROFICHE APPENDIX

None

BACKGROUND OF THE INVENTION

Twist-on wire connector are grasped in a users hand or fingers and are twisted around the exposed ends of electrical wires to join the electrical wires into contact. As wiring tasks often require usage of multiple twist-on wire connectors the users hands and fingers can become fatigued from having to repeatedly apply sufficient torque to the twist-on wire connectors to form the wire ends into electrical contact with each other while ensuring that the exposed ends of the electrical wire are covered with either insulation or the twist-on wire connector. However, because of the small size of the twist-on wire connectors as well as the need to be able to transmit both compressive and tangential forces to the wire connector it is difficult to develop a twist-on wire connector that remains both effective in forming the electrical connection as well as comfortable to use over an extended period of time while at the same time inhibiting or avoiding fatiguing and injuring the users fingers.

The concept of twist-on wire connector with a cushioned grip is known in the art, more specifically Blaha U.S. Pat. No. 6,677,530 discloses numerous embodiments of twist-on wire connectors and points out that the cushioned grip is on a portion of the exterior hard or rigid shell with the cushioned grip being an olefinic thermoplastic vulcanizate sold under the name Santoprene®, a trademark of Advanced Elastomer system of Akron, Ohio. Blaha describes a twist-on wire connector wherein the exterior of the wire connector shell has three main areas, a closed end section, a skirt and a grip-mounting portion. The grip-mounting portion is the region the user engages with his or her fingers in order to twist the wire connector into engagement with an electrical wire or wires.

Blaha points out that with molds of particularly close tolerances, such as found in the Twister® wire connector a cushioned grip can be formed over the Twister® wire connector without the use of boundary edges. The twist-on wire connector with a cushioned grip on the grip mounting portion is sold by Ideal Industries Inc. under the name Twister®PRO and is shown in the web page downloaded from the Ideal Industries which is included with the 1449 material information statement of the present application.

Blaha points out the problem of installing twist-on wire connectors with a hard shell is that if numerous connections are made the hard plastic surface can be painful on the fingers or in certain instances the shell surface can be slippery due to the sweat or soil on the users hand. As a solution to the problem Blaha proposes to place a cushioned material over the hand gripping portions of the wire connector to make the wire connector more comfortable to grasp. While Blaha recognizes that the placement of a cushion on the grip mounting portion of the twist-on wire connector may reduce fatigue Blaha does not recognize that not everyone grasps the twist-on wire connectors in the same manner or that because of cramped conditions it might not be possible to grasp the twist-on wire connector on the grip mounting portions to enable the user to benefit from the cushioned grip of Blaha. Consequently, while the Blaha twist-on wire connector has a cushioned grip it can be of little benefit to those users who do not grip the twist-on wire connector on the normal designated gripping portions or those users who might have to apply a twist-on wire connector in a location with inadequate space to position the users hand or fingers around the normal hand gripping regions of the twist-on wire connector. While Blaha U.S. Pat. No. 6,677,530 shows multiple embodiments of his cushioned grip in each of his embodiments he places his cushioned grip at the base or open end of his wire connector while leaving the end section of his wire connector proximate the closed end of the wire connector with the hard shell exposed. Ironically, if the twist-on wire connector is to be applied in a tight location it is the uncushioned end section, which the user grasps to twist the wire connector onto the wires. Since the end section usually has a smaller radius than the base or normal finger grasping portion an increased hand or finger pressure is required to obtain necessary torque to apply the twist-on wire connector. Thus, when application conditions are the most difficult one not only does one not have the benefit of cushioned grip for the users fingers but one has to generate greater hand force on the twist-on wire connector to obtain the necessary torque to bring the wire connector into engagement with the electrical wires therein.

Krup U.S. Pat. No. 3,519,707 illustrates another type of twist-on wire connector wherein a vinyl shield with ribs is placed around an exteriors surface of rigid cage that has sufficient strength and rigidity to drive the spring onto a cluster of wires. Krup states the purpose of his vinyl shell around the rigid case is to insulate and protect the connector and the wire connector. However, Krup fails to teach that the vinyl shell located around his rigid cage comprises a cushioned surface.

McNerney U.S. Pat. No. 6,478,606 shows a twist-on wire connector with a tensioally-biased cover. McNerney fits a sleeve of heat shrinkable material over a portion of his wire connector so that after a wire connection is made the heat shrinkable material can be shrunk fit around his connector to improve the bond to his connector and around the wires in order to prevent contaminants from entering the wire splice in his wire connector. In order to have ridges for gripping McNernery points out a tube of heat shrinkable material tightly grips his hard shell so as to replicate the grooves in the hard shell of his connector. Unfortunately, tightly shrinking the material around the body of connector introduces a circumferential bias or tension force in the heat shrunk material thus rendering material which may even be soft into a covering that is hard to the touch and is reluctant to yield to finger torque. Thus the heat shrunken tube on the body of his wire connector produces an external surface that resists resilient displacement and is also hard and is uncomfortable in response to the finger and hand pressure of the user since the tension and bias forces introduced by the heat shrinking limit the yielding of his material. That is, by stretching the material around the connector McNerney biases the material much like a spring under tension has an inherent bias. The bias introduced by the heat shrink process can prevent heat-shrunk material from yielding equally in all three axis. Consequently, the heat shrinkable material in effect becomes like a stretched spring, which has increased resistance to stretching. The effect is to form an elastomer material into a hard cover or non-resilient cover on a hard shell since a heat shrunk cover is limited in its ability to absorb external finger pressure. In addition any protuberances on the hard shell are carried through and become hard protuberances on the heat-shrunk layer. McNerney espouses the hardness of his heat-shrunk cover by pointing out that heat shrinking can produce a rigid case for his coil spring. In contrast to McNerney the present invention provides a cover to a twist-on wire connector that eliminates the problems generated by McNerney heat shrunk cover.

Unfortunately, whether a twist-on wire connector is finger friendly and inhibits finger fatigue is a function of a number of variables including how and where the user grasps the twist-on connector as well as subjective factors on how the twist-on wire connector feels as it is handled or when it is secured to a wire or wires within the twist-on wire connector. In addition field conditions may make it beneficial to have more than one type of cushioned connector.

SUMMARY OF THE INVENTION

Briefly, the invention comprise a finger friendly twist-on wire connector having a rigid shell and a finger cushion material integral to the rigid shell to form a finger gripping region where the finger cushion material may be molded directly to the rigid shell and circumferentially dispersed thereon to inhibit finger fatigue and finger injury as one repeatedly secures twist-on wire connectors to electrical leads. In another example, the twist-on wire connector may includes a plurality of riblets of finger cushion material interspersed between a plurality of ribs and in still other examples a set of lobes of finger cushion material, or a set of wings which may be molded as part of the rigid shell and may be used with the invention described herein. In addition, the finger friendly twist-on wire connector allows one to compressively engage both the rigid shell and the cushion grip which allows one to maintain a finger cushion effect while also obtaining feed back of the wire engagement in the coil through the direct finger contact with the rigid shell that supports the coil.

DESCRIPTION OF THE PREFERRED EMBODIMENT

Figure 1:
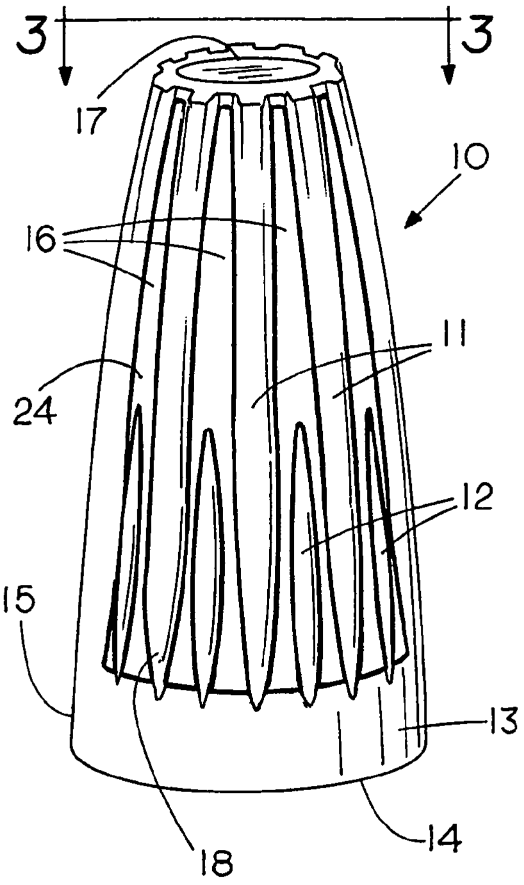
FIG. 1 is a perspective view of a finger friendly twist-on wire connector.

The cushioned grip twist-on wire connectors of FIG. 1 to FIG. 8 show various examples of finger friendly twist-on wire connectors having a finger cushion material that is molded directly to a rigid shell to provide a twist-on wire connector that allows a user to comfortably grasp and repeatedly rotate the twist-on wire connector regardless of the portion or portions of the connector contacted by the user's finger or hand.

FIGS. 1-4 shows various views of one example of a finger friendly twist-on wire connector 10. A reference to FIGS. 1-4 shows the finger friendly twist-on wire connector 10 having an open-end rigid shell 20 secured to a spiral coil 21 with the rigid shell 20 having a rigid or hard outer surface 24. Rigid shell 20 includes a closed end 24*a* and an open-end 24*c*. Extending lengthwise on outer surface 24 is a cushioned cover 11*a* forming a circumferential grasping band 10*a* of length x. In the embodiment shown the cushioned cover 11*a* includes a closed end 17, lobes 18, 18*a*, elongated ribs 11 and elongated riblets 12 of a finger cushion material with closed end 17, lobes 18, 18*a*, ribs 11 and riblets 12 molded directly to the outer surface 24 of rigid shell 20 to form circumferential finger grasping region or band and an end finger grasping region. In some cases the circumferential finger-grasping band may include the wire connector base or skirt 13 particularly if the base or skirt is made of rigid material or has a resilient covering thereon that is supported by a rigid shell.

The plurality of circumferentially spaced and lengthwise extending elongated resilient ribs 11 and elongated resilient riblets 12, which are formed from a resilient finger cushion material, are circumferentially spaced and interdispersed around the outer surface 24 of rigid shell 20 to provide a uniform grasping region regardless of the grasping orientation of the connector. The ribs 11 comprise elongated strips of resilient finger cushion material 11*a* that may be molded directly to shell and extend lengthwise from the base 15 of the twist-on wire connector 10 to the top 17 of the twist-on wire connector 10. Riblets 12, which are similar to elongated ribs 11, comprise shorter elongated strips of resilient finger cushion material that are located on and may be molded to the rigid bottom of rigid bottom channels 16. Both ribs 11 and riblets 12 are formed of a resilient finger cushion material to be resiliently deformable in response to radially and tangential finger forces applied to the twist-on wire connector 10. In the example shown, the riblets 12 are located in the plurality of circumferential spaced channels 16 and are interspersed with elongated ribs 11 to provide a circumferential gripping region of length x (FIG. 3) on the twist-on wire connector 10. The interspersing of ribs and riblets in channels 16, which have a rigid bottom, creates a circumferentially balanced finger-gripping region that includes both a firm finger gripping portion and a flexible finger-griping portion in the circumferential finger-gripping region. That is, with the rigid shell 20 and the finger cushion material in the elongated ribs 11 or riblets 12 spaced sufficiently close, i.e. less than the width of a finger, ones finger first makes contact with the resilient cushion material of the lobes, the elongated ribs or the riblets as one grasps the connector. As finger pressure is increased one makes finger contact with the rigid bottom of channels 16. By distributing or balancing the finger contact between both the resilient finger cushion material and the rigid bottom of the channels one produces a balanced finger-grasping region that reduces the finger harshness that can occur if one grasped only a rigid shell. Yet one also obtains the benefits of direct compressive finger contact with the rigid shell since a portion of the user's fingers can indirectly feel the wire engaging forces in the coil through the rigid shell since the wire engaging forces are not attenuated by the resilient cushion. Consequently, one may be better able to secure the connector to the wires. Thus, connector 10 comprises a one-piece shell having a balanced finger-grasping band which is formed from both the rigid material of the shell and the resilient material of the ribs, the riblets or the lobes to provide a connector that one can apply finger torque thereto while minimizing finger discomfort and still obtaining wire engagement feedback through at least portions of the rigid shell.

Figure 4:
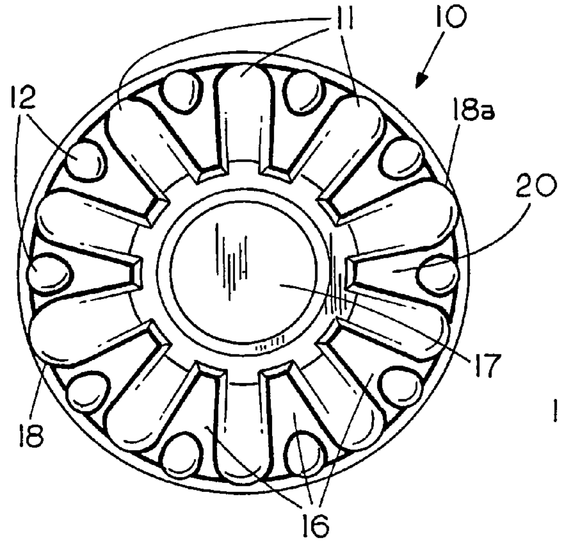
FIG. 4 is a top view of the finger friendly twist-on wire connector of FIG. 1.

A reference to FIG. 4 shows that in addition to ribs 11 and riblets 12 the finger friendly twist-on wire connector 10 includes at least two elongated lobes 18 and 18*a*, which are formed of the finger cushion material 11*a*, with the lobes 18 and 18*a* secured directly to the rigid shell 20 and extending radially outward to form a non-circular base. Although the finger friendly twist-on wire connector 10 is void of protruding rigid wings or rigid ridges the cushioned lobes 18 and 18*a* ensure the operator can apply a twist-on wire connector with as little finger fatigue as possible as the lobes 18 and 18*a*, which are wider than the ribs 11 or riblets 12, are also formed of finger cushion material and can be used to aid in grasping and twisting the wire connector 10 into electrical engagement. Thus, in the above example the finger friendly twist-on wire connector 10 is provided with an enhanced balanced gripping region through the use of a non-circular base formed by the use of the lobes 18 and 18*a* and a further balanced finger grasping region that may include both a rigid surface and the cushioned surfaces of ribs 11 and riblets 12.

In the example shown the lobes 18 and 18*a* are formed without any grooves or ridges thereon. If desired the lobes may include ridges or grooves therein. In other variations multiple lobes may be used. If multiple lobes are used it is preferred to have the diametrical dimensions of the lobes decrease as one moves circumferentially away from the lobes that have the largest diametrical dimension. In some instance the largest diametrical distance of the lobes may occur at the base of the connector and in other connectors the largest diametrical distance of the lobes may occur in a central region of the finger friendly twist-on wire connector. Lobes in contrast to wings allow one to apply both radially and compressive gripping forces to the twist-on wire connector while engaging the connector with the wires therein.

Figure 2:
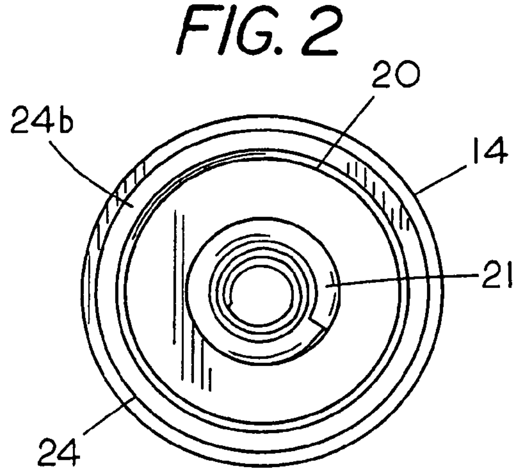
FIG. 2 is an end view of the finger friendly twist-on wire connector of FIG. 1.
Figure 3:
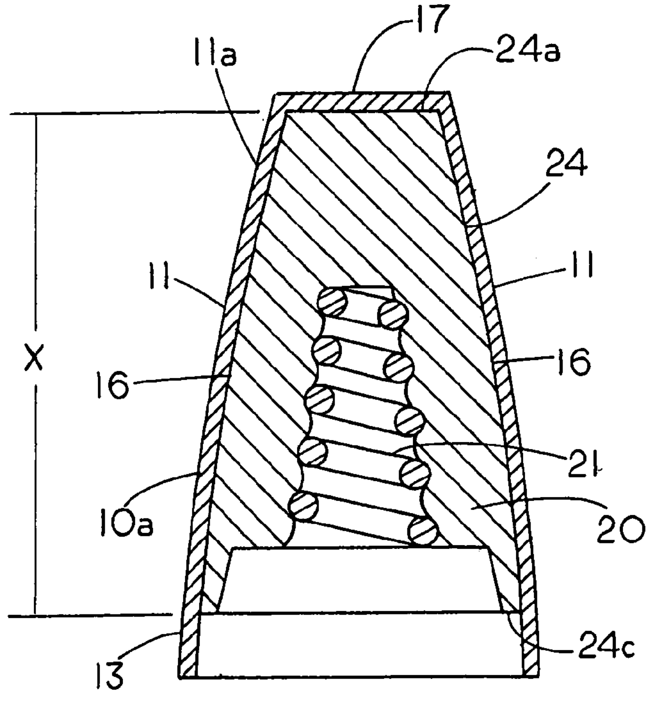
FIG. 3 is a sectional view of the finger friendly twist-on wire connector of FIG. 1 taken along lines 3-3 of FIG. 1.

A reference to FIG. 1 and FIG. 2 reveals the elongated ribs 11 each extend radially outward from the rigid shell 20 and taper down in height from the center of the rib to the ends of the ribs although in some cases other configurations of ribs may be used. FIG. 1 shows the elongated ribs 11 are circumferentially spaced from each other to thereby form rigid bottom channels 16 therebetween. The rigid bottom channels 16 being formed by the adjacent elongated ribs 11 and the exposed portion of the rigid outer surface 24 which is located between adjacent ribs 11. In this example the balanced cushioned finger-gripping region is formed by exposed portions of the rigid shell 20, which forms the channel bottoms and the lobes, the ribs 11 and riblets 12, which are formed from a finger cushion material. Thus, the circumferential balanced finger gripping region 10*a* includes both rigid portions of outer surface 24 of rigid shell 20 and the softer cushion finger cushion material which forms lobes 18 and 18*a* elongated ribs 11 and elongated riblets 12.

As shown in FIG. 1 and FIG. 2 the elongated ribs 11 and riblets 12, which are molded to rigid shell 20, each extend radially outward from the rigid shell 20 to form channels 16 between adjacent ribs or riblets with the elongated ribs 11 and riblets 12 interspersed with channels 16. In this example the rigid bottoms of the channels 16 also form a portion of a finger-gripping region. The elongated ribs 11 and riblets 12 are spaced sufficiently close so that finger contact is first made with the protruding elongated ribs 11 or protruding elongated riblets 12 before finger contact can be made with the rigid bottom of channels 16 thus allowing a user to firmly and comfortably grip the twist-on connector in the finger gripping region while minimizing harsh contact between the rigid shell 20 and the users fingers since the finger cushion material of ribs and riblets prevents at least a portion of the user's fingers from direct contact with the rigid shell 20 thus minimizing harsh compressive contact between the rigid shell and the user's fingers. Although the ribs and riblets are preferably molded directly to the rigid shell other methods of securing ribs or riblets to the rigid shell may be used. Likewise it is envisioned that rigid shell 20 may be formed from material that is less than rigid while still providing support for the wire coil 21 that is used to engage the electrical wires.

Figure 5:
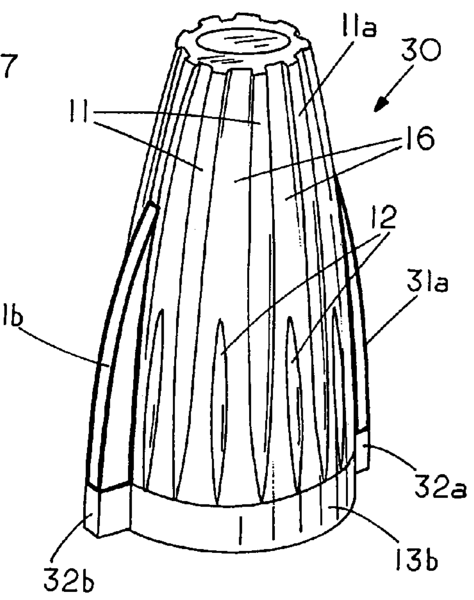
FIG. 5 is a perspective view of a finger friendly twist-on wire connector including an integral rigid wing with flexible wings located beneath the rigid wings.
Figure 5A:
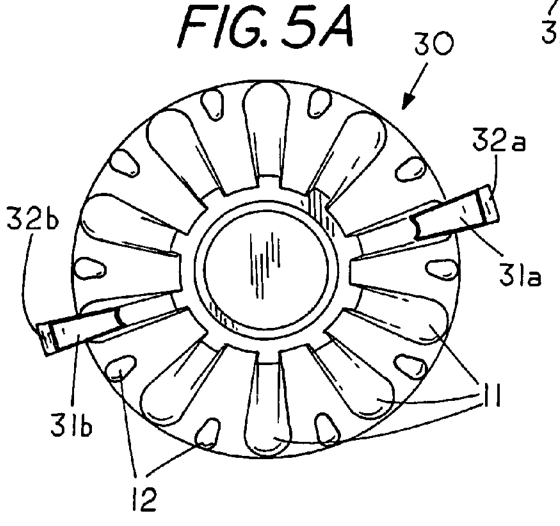
FIG. 5A is a top view of the finger friendly twist-on wire connector of FIG. 5.

FIG. 5 and FIG. 5A show an example of the twist-on wire connector 30 where the finger cushion material 11*a* covers the entire outer surface of the rigid shell with the exception of a set of rigid wings 31*b* and 31*a* which protrude radially outward sufficiently far that one can impart rotational force to the connector without having to simultaneously apply compressive force to the connector. While the ribs 11 and riblets 12 are identical to those in the wire connector 10 the channels 16 between the ribs 11 and riblets 12 include a layer of finger cushion material 11*a* that covers the outer surface of the rigid shell as well as forming integral ribs 11 and riblets 12. Extending radially outward from one side of connector 30 is a first rigid wing 31*b* and extending radially outward from the opposite side of connector 30 is a second rigid wing 31*a*, which is located diametrically opposite from rigid wing 31*b*. In this example the rigid wings may provide for mechanical engagement if desired since the rigid wings extend radially outward from the rigid shell so that a tool can be engaged therewith. Located at the base of rigid wing 31*b* is a flexible wing 32*b* which is made from finger cushion material 11*a*. Similarly, located at the base of rigid wing 31*a* is a flexible wing 32*a*. Flexible wing 32*a* and flexible wing 32*b*, which are resilient, allow the finger cushion material to be molded directly to the exterior of a rigid shell without having to remove the connector from the mold or to provide mold inserts. A molded skirt 13*b*, which is made from a flexible material, forms a flexible base, which in the preferred embodiment is the same finger cushion material, that is used to form the ribs on the finger friendly twist-on wire connector 30. A feature of the finger friendly twist-on wire connector 30 is the pair of flexible wings 32*b* and 32*a* that extend radially outward from the skirt with each of the pair of flexible wings located in alignment with each of the rigid uncushioned wings 31*b* and 31*a*. A further feature of the finger friendly twist-on wire connector 30 is that rigid shell, which supports the spiral coil, includes a set of integral rigid uncushioned wings 31*b* and 31*a* extending radially outward from the rigid shell with the wings to enable one the option to use a tool to rotate the wire connector. A further feature of connector 30 is that it comprises a one-piece shell having a finger-grasping band which is formed from both the rigid material of the shell and the resilient material of the ribs, the riblets or the lobes.

Figure 6:
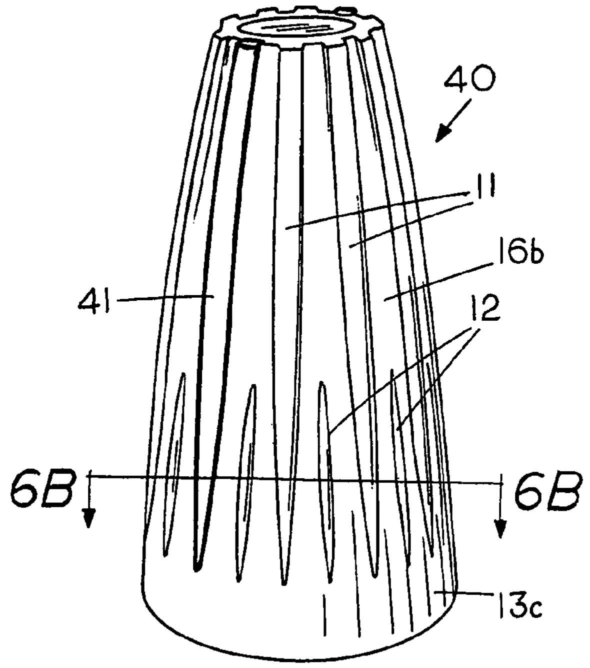
FIG. 6 is a perspective view of a finger friendly twist-on wire connector with a set of integral lobes.
Figure 6A:
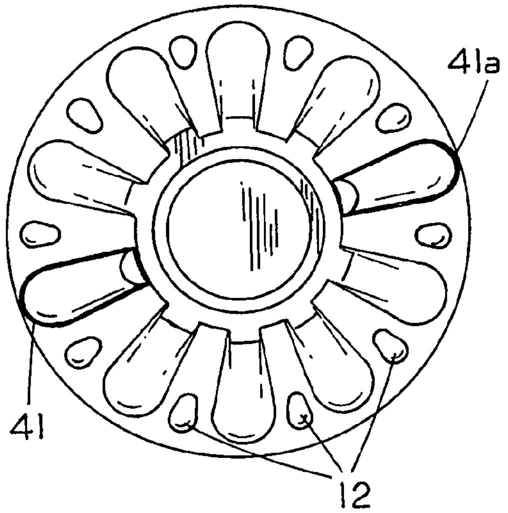
FIG. 6A is a top view of the finger friendly twist-on wire connector of FIG. 6.
Figure 6B:
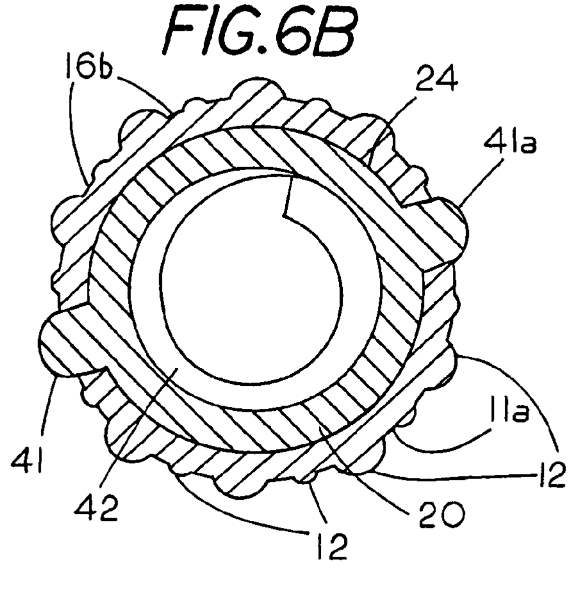
FIG. 6B is a sectional view of the finger friendly twist-on wire connector of FIG. 6 taken along lines 6*b*-6*b* of FIG. 6.

FIG. 6, FIG. 6A and FIG. 6B show a twist-on wire connector 40 similarly to twist-on wire connector 10 having both ribs 11 and riblets 12. In the twist-on wire connector 40 the bottom of channels 16*b* are covered with finger cushion material. In contrast to the cushion covered lobes of FIG. 1 the elongated lobes 41 and 41*a* are made of rigid material and are integral to the rigid shell 20. Rigid lobes 41 and 41*a* provide a rigid support for ones fingers while the remaining outer portion of connector 40 is covered with a finger cushion material. Extending downward from the connector to form a connector base 13*c* is an integral flexible skirt 13*c* which is molded directly on and extends axially outward from the rigid shell 20. Integral skirt 13*c* comprises a flexible material to allow the skirt flex as the wires are secured to the coil 42, which is secured rigid shell 20 of twist-on wire connector 40. In this embodiment the finger cushion material encapsulates the base of the rigid shell to form an integral resilient skirt 13*c*. Thus connector 40 comprises a one-piece shell having a finger-grasping band which is formed from both the rigid material of the shell and the resilient material of the ribs and the riblets and an integral resilient skirt while leaving a pair of rigid lobes protruding through the cushion material 11*a*.

A reference to sectional view FIG. 6B shows a cross sectional view of the finger friendly twist on connector 40 with the finger cushion material 11*a* that covers the outer rigid surface 24 of shell 20 which supports the helical wire coil 42 with the exception of the rigid lobes that protrude through the finger cushion material 11*a*.

Figure 7A:
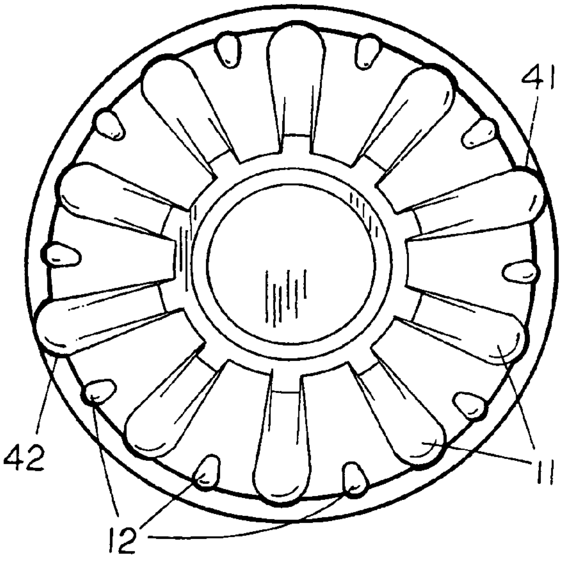
FIG. 7A is a top view of the finger friendly twist-on wire connector of FIG. 7.
Figure 7:
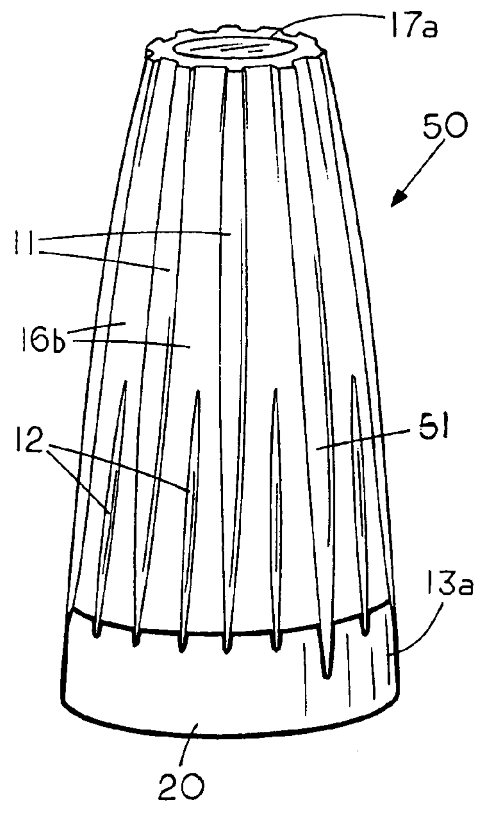
FIG. 7 is a perspective view of the a finger friendly twist-on wire connector with a skirt of a rigid material.

FIG. 7 and FIG. 7A show a twist-on wire connector 50 with the finger friendly twist-on wire connector 50 having an upper portion of a rigid shell covered with a finger cushion material and a base comprising an integral rigid skirt 13*a* which extends downward as part of rigid shell 20 with the rigid skirt 13*a* void of finger cushion material.

The channels 16*b* and the remainder of the twist-on connector 50 including the circumferential portion and the closed end portion 17, which are above base 13*a*, are covered with a layer of finger cushion material 11*a* to protect the user's fingers as the twist-on wire connector is secured to an electrical wire or wires. Thus connector 50 comprises a one-piece shell having a finger-grasping region including a closed end 17 and a circumferential finger-grasping band which is formed from the resilient material of the ribs and the riblets. In addition rigid base 13*a* may also be grasped to apply rotational forces thereto since it can support compressive finger forces.

Figure 8:
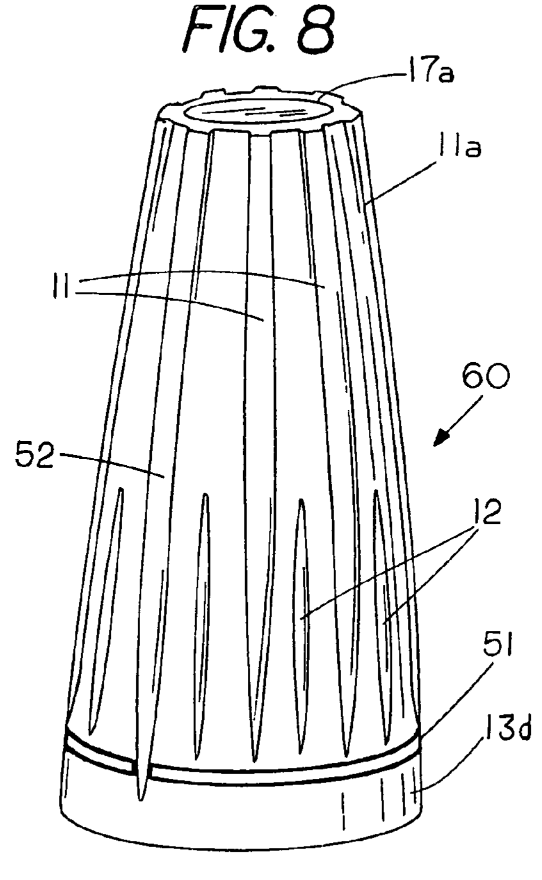
FIG. 8 is a perspective view of a finger friendly twist-on wire connector.

FIG. 8 shows an example of a finger friendly twist-on wire connector 60 where the connector includes an outer layer of finger cushion material 11*a* that includes elongated ribs 11 and riblets 12 as well as lobe 52 and a diametrically opposite lobe (not shown) which are formed of resilient finger cushion material.

A flexible skirt 13*d* extends around the base of the twist-on wire connector 50 with an annular band 51 of rigid material extending circumferentially around twist-on wire connector 50 to alert the user to the finger grasping region above the skirt 13*d*. If desired the annular band 51 may be made of different color material so as to alert a user that the connector 50 has a flexible skirt. The finger friendly twist-on wire connector 50 includes a skirt of a finger cushion material wherein the resilient finger cushion material with the elongated ribs and riblets separated from the skirt by an annular band of rigid material 51. Thus finger friendly twist-on wire connector 60 comprises a one piece shell having a finger grasping end and a finger-grasping band which is formed the resilient material of the ribs and riblets with an annular band 51 of rigid material identifying the flexible skirt 13*d* on the wire connector.

Examples of finger cushion material are described in co pending patent application and are herein incorporated by reference. Typically, the finger cushion material is formed from a resilient non-electrical conducting material or electrical insulator that is soft to the touch. Since the twist-on wire connectors can be grasped in a variety of directions the use of cushion material that comprises a tensional unbiased covering 11*a* ensures that regardless of the direction of grasping of the connector the cushion cover will resiliently compress to provide a cushion grip for the user's fingers. While various types of cushion material may be used as the cushion cover or the layer of tensionally unbiased resilient material when the material is secured to and extending over the exterior surface of the hard shell it enables one to engage a finger friendly cover with the layer of resilient material providing three axis deflection with sufficient compressibility so as to comfortably compress in response to radial finger pressure and to laterally deform in response to finger torque regardless of a finger grasping position on the cushion cover. The layer of cushion material should have sufficient shear resistance so as to resiliently yield without tearing when a hand torque is applied to cushions material thus assuring one that the wire connector can be comfortably applied with hand or finger torque.

We claim:

1. A finger friendly twist-on wire connector comprising:

a spiral coil;

an open-end rigid shell secured to the spiral coil with the rigid shell having an outer surface with a circumferential band and a closed end;

a plurality of channels extending in a lengthwise direction along said circumferential band; and a resilient finger cushion material molded to the outer surface of the closed end of the rigid shell with the resilient finger cushion material including a plurality of circumferentially spaced elongated ribs resiliently deformable in response to radially and tangential finger forces thereon as rotational finger forces are transmitted to the rigid shell through the resilient finger cushion material to thereby inhibit finger fatigue and finger injury; and a plurality of riblets of resilient finger cushion material extending in a lengthwise direction along said circumferential band with said riblets located in said plurality of channels and interspersed with said elongated ribs to provide a circumferential cushioned gripping region on the twist-on wire connector.

2. The finger friendly twist-on wire connector of claim 1 wherein the resilient finger cushion material completely encapsulates the outer surface of the open-end rigid shell except an annular band separating a skirt from a finger-gripping region of the finger friendly twist-on wire connector.

3. The finger friendly twist-on wire connector of claim 1 wherein the resilient finger cushion material includes at least two elongated lobes molded to said rigid shell.

4. The finger friendly twist-on wire connector of claim 1 wherein the resilient finger cushion material forms an integral resilient skirt to the twist-on wire connector.

5. The finger friendly twist-on wire connector of claim 1 wherein the plurality of channels are rigid bottom channels and the rigid bottom channels and the resilient cushion material coact to produce a balanced finger grasping region where a user's finger compressively contact both the rigid shell and the resilient finger cushion material with the finger contact with the rigid shell providing wire engaging feedback without the force attenuation of the resilient finger cushion material while the finger contact with the resilient finger cushion material inhibits fatigue and injury to a user's fingers.

6. The finger friendly twist-on wire connector of claim 5 wherein a riblet of the resilient finger cushion material is located in said rigid bottom channels.

7. The finger friendly twist-on wire connector of claim 1 wherein the rigid shell includes a set of rigid uncushioned wings extending radially outward from the rigid shell.

8. The finger friendly twist-on wire connector of claim 1 including an integral rigid skirt extending from said rigid shell with the rigid skirt void of the resilient finger cushion material.

9. The finger friendly twist-on wire connector of claim 1 including a flexible skirt and a pair of flexible wings with each of the pair of flexible wings located in alignment with a rigid uncushioned wing.

10. A finger friendly twist-on wire connector comprising:

a spiral coil;

an open-end rigid shell secured to the spiral coil with the open-end rigid shell having an outer surface with a circumferential band and a closed end;

a resilient finger cushion material integral to the outer surface of the closed end of the rigid shell with the finger cushion material including a plurality of circumferentially spaced elongated ribs resiliently deformable in response to radially and tangential finger forces thereon as rotational finger forces are transmitted to the rigid shell through the resilient finger cushion material to thereby inhibit finger fatigue and finger injury, said elongated ribs each extend radially outward from the open-end rigid shell with the elongated ribs interspersed with exposed portions of the open-end rigid shell so that a finger gripping region includes both a the open-end rigid shell and the finger cushion material of the elongated ribs.

11. A finger friendly twist-on wire connector comprising:

a spiral coil;

an open-end rigid shell secured to the spiral coil with the rigid shell having an outer surface with a circumferential band and a closed end;

a resilient finger cushion material integral to the outer surface of the closed end of the rigid shell with the finger cushion material including a plurality of circumferentially spaced elongated ribs resiliently deformable in response to radially and tangential finger forces thereon as rotational finger forces are transmitted to the rigid shell through the resilient finger cushion material to thereby inhibit finger fatigue and finger injury; and a skirt of the resilient finger cushion material wherein the resilient finger cushion material with the elongated ribs is separated from the skirt by an annular band of rigid material.

12. A finger friendly twist-on wire connector comprising:

a spiral coil;

an open-end rigid shell secured to the spiral coil with the rigid shell having an outer surface with a circumferential band and a closed end; and a resilient finger cushion material integral to the outer surface of the closed end of the rigid shell with the finger cushion material including a plurality of circumferentially spaced elongated ribs resiliently deformable in response to radially and tangential finger forces thereon as rotational finger forces are transmitted to the rigid shell through the resilient finger cushion material to thereby inhibit finger fatigue and finger injury, said elongated ribs each extend radially outward from the rigid shell to form rigid bottom channels between the adjacent elongated ribs with the elongated ribs interspersed with the rigid bottom channels so that a finger gripping region includes both a portion of the rigid bottom channels and the finger cushion material of the elongated ribs with the ribs spaced sufficiently close so that finger contact is first made with the elongated ribs before finger contact is made with the rigid bottom channels.

* * * * *

UNITED STATES PATENT AND TRADEMARK OFFICE

CERTIFICATE OF CORRECTION

PATENT NO. : 8,212,147 B2
APPLICATION NO. : 12/586947
DATED : July 3, 2012
INVENTOR(S) : Rhea et al.

It is certified that error appears in the above-identified patent and that said Letters Patent is hereby corrected as shown below:

Claims:

Claim 10, col. 10, line 1 “includes both a the open-end rigid” should read --includes both the open-end rigid--

Claim 11, col. 10, line 19 “is separated” should read --separated--

Claim 12, col. 10, line 30 “response to radially and tangential” should read --response to radial and tangential--

Signed and Sealed this
Eleventh Day of September, 2012

David J. Kappos
*Director of the United States Patent and Trademark Office*